(12) United States Patent
Zeineh et al.

(10) Patent No.: US 7,778,485 B2
(45) Date of Patent: Aug. 17, 2010

(54) SYSTEMS AND METHODS FOR STITCHING IMAGE BLOCKS TO CREATE SEAMLESS MAGNIFIED IMAGES OF A MICROSCOPE SLIDE

(75) Inventors: Jack A. Zeineh, Fullerton, CA (US); Rui-Tao Dong, Mission Viejo, CA (US)

(73) Assignee: Carl Zeiss MicroImaging GmbH, Jena (DE)

( * ) Notice: Subject to any disclaimer, the term of this patent is extended or adjusted under 35 U.S.C. 154(b) by 650 days.

(21) Appl. No.: 11/218,073

(22) Filed: Aug. 31, 2005

(65) Prior Publication Data
US 2006/0045388 A1 Mar. 2, 2006

Related U.S. Application Data

(60) Provisional application No. 60/605,835, filed on Aug. 31, 2004, provisional application No. 60/609,961, filed on Sep. 15, 2004.

(51) Int. Cl.
*G06K 9/36* (2006.01)
(52) U.S. Cl. ..................................................... 382/284
(58) Field of Classification Search ................ 382/128, 382/173, 180, 276, 282, 284; 600/300; 345/501, 345/639, 530, 640, 418, 427, 557, 531
See application file for complete search history.

(56) References Cited

U.S. PATENT DOCUMENTS

| | | | | |
|---|---|---|---|---|
| 5,659,489 A * | 8/1997 | Baldur | ......................... | 382/108 |
| 5,991,461 A * | 11/1999 | Schmucker et al. | ......... | 382/284 |
| 6,005,964 A | 12/1999 | Reid et al. | | |
| 6,084,988 A * | 7/2000 | Kanno et al. | ................ | 382/289 |
| 6,101,265 A * | 8/2000 | Bacus et al. | ................ | 382/133 |
| 6,528,787 B2 * | 3/2003 | Katagami et al. | ........... | 250/310 |
| 6,687,419 B1 * | 2/2004 | Atkin | ......................... | 382/284 |
| 6,873,329 B2 * | 3/2005 | Cohen et al. | ................ | 345/501 |
| 2002/0039434 A1 * | 4/2002 | Levin et al. | ................. | 382/128 |
| 2003/0210262 A1 * | 11/2003 | Gahm et al. | ................ | 345/732 |
| 2004/0114218 A1 * | 6/2004 | Karlsson et al. | ............ | 359/368 |
| 2005/0084175 A1 * | 4/2005 | Olszak | ....................... | 382/284 |

OTHER PUBLICATIONS

Fisher et al., Image Analysis—Connected Components Labeling, http://homepages.inf.ed.ac.uk/rbf/HIPR2/label.htm, © 2003, print date of Aug. 30, 2004, 8 pages.

(Continued)

*Primary Examiner*—Samir A. Ahmed
*Assistant Examiner*—Atiba O Fitzpatrick
(74) *Attorney, Agent, or Firm*—Patterson Thuente Christensen Pedersen, P.A.

(57) ABSTRACT

Scanned image portions of virtual slide are stored in accord with a positional index metric associated to each image's location in a mosaic representation of the entire physical slide and a normalized correlation search is performed on next neighbor regional image blocks. A set of relative positional offset values and a correlation coefficient is determined for a regional image block and a next neighbor regional image block. A portion of the regional image blocks is viewed as a field of view of a display and a composite of the potion of regional image blocks is stitched together in accord with the set of relative positional offset values and the correlation coefficient, such that only the blocks comprising the portion are stitched. Moving the field of view of the display causes additional regional image blocks to be displayed, where image stitching is subsequently performed only with respect to the additional regional image blocks brought into the new field of view.

16 Claims, 7 Drawing Sheets

OTHER PUBLICATIONS

Fisher et al., Connected Components Labeling, Internet Archive Wayback Machine, http://web.archive.org/web/20040807020507/http://www.cee.hw.ac.uk/hipr/html/label.html, © 1994, Internet Archive Wayback machine date of Aug. 7, 2004, 5 pages.

* cited by examiner

| (0, 0) | (0, 1) | (0, 2) | (0, 3) |
| --- | --- | --- | --- |
| (1, 0) | (1, 1) | (1, 2) | (1, 3) |
| (2, 0) | (2, 1) | (2, 2) | (2, 3) |

SYSTEMS AND METHODS FOR STITCHING IMAGE BLOCKS TO CREATE SEAMLESS MAGNIFIED IMAGES OF A MICROSCOPE SLIDE

CROSS REFERENCE TO RELATED APPLICATIONS

The present application is related to and takes priority from U.S. Provisional Application Ser. Nos. 60/605,835, and 60/609,961, filed Aug. 31, 2004 and Sep. 15, 2004, respectively, and is further related to co-pending U.S. patent application entitled SYSTEM AND METHOD FOR CREATING MAGNIFIED IMAGES OF A MICROSCOPE SLIDE, all commonly owned by the assignee of the present application, the entire contents of which are expressly incorporated herein by reference.

FIELD OF THE INVENTION

The invention relates generally to a system and method for creating virtual microscope slides, and more particularly, to a method and system for creating seamless images of virtual microscope slides.

BACKGROUND OF THE INVENTION

A virtual microscope slide typically comprises digital data representing a magnified image of a microscope slide. Because the virtual slide is in digital form, it can be stored on a 10 medium, such as in a computer memory, for example, and can be transmitted over a communication network, such as the Internet, an intranet, etc., to a viewer at a remote location.

Virtual slides offer advantages over traditional microscope slides. In some cases, a virtual slide can enable a physician to render a diagnosis more quickly, conveniently and economically than is possible using traditional microscope slides. For example, a virtual slide 15 may be made available to a remote user, such as a specialist in a remote location, for example, over a communication link, enabling the physician to consult with the specialist and provide a diagnosis without delay. Alternatively, the virtual slide can be stored in digital form indefinitely, for later viewing at the convenience of the physician or specialist.

Typically, a virtual slide is generated by positioning a microscope slide (which 20 contains a sample for which a magnified image is desired) under a microscope objective lens, capturing one or more images covering all, or a portion, of the slide, and then combining the images to create a single, integrated, digital image of the slide. It is often desirable to divide a slide into multiple regions and generate a separate image for each region. This is because, in many cases, an entire slide is often larger than the field of view of a high-power objective lens (a 10×, 20×, or even 40×, for example) and multiple images must be obtained in order to render the entire slide image at the desired magnification. Additionally, the surfaces of many tissue types are uneven and contain local variations that make it difficult to capture an in-focus image.

When the sample is larger than a single field of view, the regions that are imaged must be combined in some fashion in order to produce a single image. These blocks of images must be combined such that image produced is without artifact due to image misalignment. This can be accomplished in several ways. One system might utilize a very accurate x-y stage in order to produce images at precise positions such that, in the claimed theory, simple abutting of the images should produce a seamless, well registered set of images. Other methods rely on software algorithms to determine the optimal registration for a set of images. This process is often referred to, in the art, as stitching (or alternatively, mosaicing). These stitching algorithms take a number of images and attempt to optimally position these blocks of images such that a seamless well formed image results.

Some algorithms will utilize image modification, such as image warping, to produce more optimal alignment between blocks of images. This process has many drawbacks, particularly in the case of medical imaging systems, since accuracy is so important to a diagnostician. Image modification may be undesirable, as it can lead to side effects such as resolution reduction and aliasing. Also, image modification can be very computationally expensive and time consuming. Furthermore, creation of an optimal image position within a global coordinate system may result multiple solutions. Which solution to select and the reproducibility of the process are issues that need to be addressed.

SUMMARY OF THE INVENTION

The particular features, aspects and advantages of the invention are directed to a microscopy system of the type in which physical material sample slides are supported for viewing and image capture. The physical slides are moveable through a microscope optical field of view. The invention is related a method for viewing a digital, virtual slide having seamless edge quality characteristics, and comprises defining multiple digital regional images for each physical slide, and scanning the physical slide in accord with the defined multiple digital regional images.

The scanned images are stored in accord with a positional index metric associated to each image's location in a mosaic representation of the entire physical slide and a normalized correlation search is performed on next neighbor regional image blocks. A set of relative positional offset values and a correlation coefficient is determined for a regional image block and a next neighbor regional image block. A portion of the regional image blocks is viewed as a field of view of a display and a composite of the portion of regional image blocks is stitched together in accord with the set of relative positional offset values and the correlation coefficient, such that only the blocks comprising the portion are stitched.

Advantageously, moving the field of view of the display causes additional regional image blocks to be displayed, where the stitching step is subsequently performed only with respect to the additional regional image blocks brought into the new field of view.

In an additional aspect of the invention, multiple regions for each physical slide, are defined, with each region having an area characterized at least by a width dimension W. An image of a first defined region is captured, wherein the microscope is positioned, relative to the physical slide, at a first position. The position of the microscope is adjusted to a second position along a dimension characterized by W and an overlap value (Overlap X), and an image of a second defined region is captured, wherein the second region and the first region share image data contained within an overlap region defined by Overlap X. A particular feature of the present invention is that the determining step is performed on image data contained in the overlap region between next neighbors.

In a further aspect of the invention, multiple regions are defined for each physical slide, each region having an area characterized at least by a height dimension H. An image of a first defined region is captured, wherein the microscope is positioned, relative to the physical slide, at a first position.

The position of the microscope is then adjusted to a second position characterized by H and a second overlap value (Overlap Y), and an image of a second defined region is captured, wherein the second region and the first region share image data contained within an overlap region defined by Overlap Y.

Advantageously, the determining step of the method according to the invention is performed on image data contained in either of the overlap regions between next neighbors. Alternatively, the determining step of the method is performed on image data contained in both of the overlap regions between next neighbors.

The set of relative positional offset values and a correlation coefficient for a regional image block and a next neighbor regional image block is determined by a normalized correlation search, and the set of relative positional offset values and the correlation coefficient associated to each regional image block is stored as a data set corresponding to that regional image block. A subset of the regional image blocks is presented for viewing in a display, and the overlapping portions of next neighbor regional image blocks are joined by positioning each block with respect to its next neighbor in accord with the set of relative positional offset values determined for the blocks.

In a further aspect, the invention may be characterized as a viewing system for imaging digital data representing a virtual microscopy slide, and a method for seamlessly joining regional images together into a composite image defining a field of view of the viewing system. In this regard, the method comprises subdividing a physical microscopy slide into a matrix of composite regional images, each regional image having a row, column index position within the matrix; scanning the physical microscopy slide with a chosen objective lens such that the lens field of view is equivalent to a size of a composite regional image; overlapping a specified portion of a next neighbor regional image with a current regional image, such that the images share image data in the specified overlap portion; determining a set of offset values for the current image and its next neighbor such that the overlap portion for the current image is highly correlated to the overlap portion of the next neighbor image; and displaying the current image stitched to the next neighbor image without regard to offset values of images not being presently displayed. The method further includes generation of a correlation coefficient for the overlap portions based upon the determined offset values.

Certain advantageous features of the invention include evaluating which particular ones of the composite regional images are required to represent a currently invoked field of view of a virtual microscopy slide; retrieving said particular ones of the composite regional images along with the corresponding sets of offset values and associated correlation coefficients; locating retrieved regional images in a viewer, in accord with their nominal index position within the matrix; comparing correlation coefficient values of next neighbor images against a threshold value; defining a positive connectivity criterion between next neighbor images having correlation coefficient values greater than or equal to the threshold; and positioning said retrieved images with respect to one another such that overlap portions of next neighbor images define a seamless edge between the two next neighbor images.

A connected components labeling algorithm is applied to the plurality of regional images, and a common algorithmic label is assigned to regional image blocks having a positive connectivity criterion associated therewith. Image blocks, having the common algorithmic label, are formed into a connected component. One overlap region is chosen from either a current image block or the next neighbor image block as representing the digital image data contained in the overlap region, and the retrieved images are positioned with respect to one another such that the chosen overlap region defines a seamless edge between the two next neighbor images.

The invention may be implemented in a microscopy system of the type in which physical material sample slides are supported for viewing and image capture, the physical slides moveable through a microscope optical field of view. Such a system includes a microscope, the microscope in turn including a rotatable turret holding a plurality of microscope objectives, each objective with a corresponding magnification. The system further includes a robotically controlled sample stage, the stage movable along orthogonal planar axes, and means for determining a present position of the stage along each of the axes, with respect to an initial index position.

A processor, coupled to the stage, controls stage motion such that a physical slide may be scanned as digital data into a memory data store, the physical slide being represented as a matrix of composite image blocks, each image block having a corresponding row, column location within the matrix and each image block is characterized by dimensions in first and second directions, the processor causing next neighbor image blocks to be scanned such that a specified and reproducible overlap portion is created between them.

The system further includes a correlation processor, the correlation processor determining offset values, along the first and second directions, between next neighbor image blocks, wherein the offset values define a relative positioning vector necessary to position the next neighbor image blocks with respect to one another such that their overlap portions appear as a seamless edge region.

A viewer, suitable to display a portion of the matrix of composite image blocks as a high resolution partial image of the physical slide may comprise an image stitcher, under microprocessor operational control, the image stitcher presenting composite image blocks for viewing and stitching next neighbor blocks together in accord with their define relative positioning vectors. Advantageously, the stitcher only stitches together those image blocks necessary to build a desired field of view in the viewer, and is further operative to stitch subsequent image blocks into a field of view as a user invokes movement along the first and second directions to a new field of view.

BRIEF DESCRIPTION OF THE DRAWINGS

These and other features, aspects, and advantages of the present invention will be more apparent when considered in connection with the following specification, appended claims and accompanying drawings, wherein:

DETAILED DESCRIPTION OF THE INVENTION

The various embodiments, described herein, provide improved systems and methods for creating well seamed virtual microscope slides. In one particular aspect of an exemplary embodiment, optimal relative alignments of each image to the next are computed. The computed optimal relative alignments are then used by a dynamic stitching system in order to present a well seamed set of images in, for example, an image viewer. The dynamic stitching system may be implemented in either software or hardware, or indeed be implemented in a combination of the two, as will be well understood by those having skill in the software and firmware arts.

During the viewing process, this dynamic stitching system determines optimal alignments for the various blocks of images contributing to the currently viewed image. The relative alignments for each of the image blocks contributing to the viewed area are examined in context with the relative alignments for the other blocks. Image blocks that do not contribute to the currently viewed area are ignored; thereby allowing the stitching system to exhibit much more flexibility in aligning blocks. An optimized set of positioning offsets is determined for the viewing area, such that blocks of images, that contribute to the current view, are optimally seamed together. As the current view changes, and presentation of additional blocks of images is required to populate the new viewing area, the dynamic stitching system is reinvoked to determine new optimal position offsets for the new block(s) that contribute to the new viewing area.

By making optimal alignment determinations limited to the currently viewed area, the ability to make well seamed virtual slides is significantly improved in both speed and power. Prior systems attempt to create a single, globally stitched image, in a process herein referred to as "global stitching", on an a priori basis. In effect, all image blocks are processed, all offsets are determined, and a "complete" image is contemplated before any attempt at displaying such image is attempted. Attempting to create a single, globally stitched image can be a very difficult problem to solve, even with the use of high precision mechanical systems. Certain well known characteristic distortion properties of microscope optical systems, such as non-telecentricity and non-coplanarity, cause magnification changes that result in spatial distortion of images.

Although the absolute degree of optical distortion of a single image is often very small, on the order of about 1 pixel, for example, optical distortion is no rectilinear in nature. If one is attempting to stitch multiple blocks of images (often in the hundreds, and sometimes in the thousands) together utilizing a global stitching system, these types of errors are cumulative, making a global stitch impossible without incorporating image un-warping techniques. Notably, image un-warping has its own disadvantages, such as higher computational requirements, image resolution reduction, and exhibits particular difficulty in parallelizing the resulting image with the scanning process.

Fortunately, for most imaging applications, creation of a globally stitched "master image" is not generally required. What is required, however, is that a particular field of view that a human being or an imaging program is looking at, be stitched. By changing the viewing paradigm to one of creating single fields of view that are presented in a well-stitched fashion, as a new field is requested by the user of the viewer, the problem is dramatically changed. As opposed to an a priori, computationally intensive, global process, the methodology of the present invention recognizes that only images that contribute to the current field of view must be stitched.

The various exemplary embodiments, described and shown herein, have numerous advantages over the previously described systems utilized by the prior art. For example, since imaging is performed on what might be termed a "local" basis, the cumulative errors that plague global stitching techniques are avoided. Since global stitching is not required, the various computationally intensive image processing techniques of the prior art are unnecessary. Thus, image un-warping or image projection methodologies, need only be used in severe situations.

In one embodiment of the invention, as blocks of images are acquired from a virtual slide imaging device (i.e., as images are scanned), the image blocks are simultaneously sent to both a compression system and a relative image matching system, hosted in a processor that might be provided as part of a microscopy scanning system. The compression system and the relative matching system are suitably implemented in either software, firmware and/or hardware. Although described above as comprising part of a microscopy system, the image matching system may be just as easily implemented in a processor which is provided as part of an image viewing system (alternatively called "the viewer").

In a manner well known to those having skill in the art, the compression system compresses the contents of blocks of images it receives and writes the compressed data to a virtual slide file. The image matching system then receives the blocks of images and calculates optimal relative offsets to two images: the image to the left and the image above a selected image. After these relative offsets are calculated, they are written to a file that is stored in volatile, or non-volatile memory, such as a disk drive, DVD, CD-ROM, or some other such memory storage device.

At the end of the scanning process, compressed image data and relative stitching offsets are written to a memory storage device. During the viewing process, as the user navigates the image, by specifying particular viewing regions, the stitching system (in a processor of the viewer, perhaps) is invoked and dynamically and automatically, determines optimal alignments for the contributing images using the relative offsets calculated during the scanning process. The user thereby experiences a seamless or nearly seamless image viewing experience. As was described above, in the context of the compression and matching systems, the stitching system may also be implemented as hardware, software, or firmware in a processor that may be disposed in a microscopy system, or associated with a viewing system.

As will be described in greater detail below, a physical microscope slide must be examined as a series of multiple images, especially when the slide must be evaluated at high magnification. A single slide, expressed as a 40× or an even higher magnification image, must be comprised of multiple (possibly hundreds of) individual field of view scans that are necessarily arranged in a matrix. A set of scans, that might go from left to right, and raster from row-to-row, are indexed on a positional basis, in order to define the entire contextual data set of a physical slide. As these images are captured and associated to their relative position within the matrix (mosaic) a "virtual slide" is created, where digital data takes the place of, and represents, the analog, optical data seen by a clinician when looking through a microscope eyepiece. Thus, each field of view of the microscope defines an image (also termed herein a "region") and, during each scan, an image for each defined region is obtained.

Figure 1:
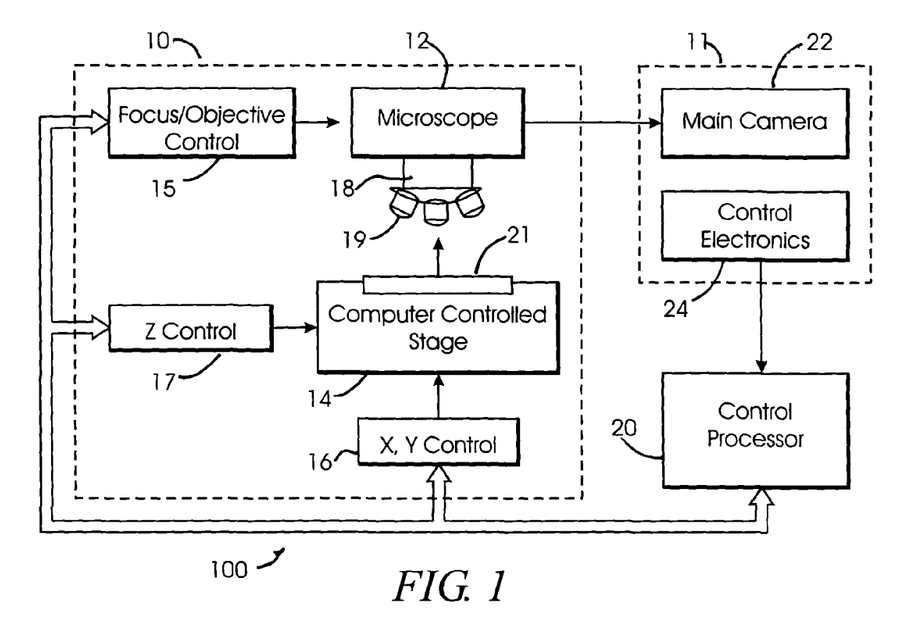
FIG. 1 is a simplified, semi-schematic block diagram of an imaging system that may be used to obtain images of a microscope slide, in accordance with the present invention.

FIG. 1 is a simplified, semi-schematic block diagram of an exemplary imaging system 100 that may be used to obtain magnified images of a microscope slide, in accordance with an embodiment of the invention. The imaging system 100 suitably comprises a microscopy system 10, a camera (or imaging) system 11 and a control processor 20. The microscopy system 10 is provided with at least one rotatable objective turret 18, of the type capable of supporting two, three, four, or five optical objectives, or lenses, of varying magnification. The microscopy system 10 further comprises a computer-controlled microscope stage 14. The microscope stage 14 is automatically movable along the x, y, and z axes, and is robotically controllable by mechanically coupling x, y, and z translation motors to the stage platform through a control system, referred to herein as X,Y control 16 and Z control 17. A suitable illumination source (not shown) is disposed beneath the microscope stage 14 and is also movable, along the x, y translational axes, beneath the stage, in order to shift the apparent illumination source with respect to a specimen on the microscope stage 14.

Both the translational motion of the microscope stage 14 and the intensity of the illumination source are controllable by a software program, operating under application software control, on the control processor 20, for example. As will be understood by those having skill in the microscopy arts, a condenser might be provided that collects light produced by illumination source and directs it toward the sample.

Rotation of the objective turret 18, moves a desired objective lens into the microscope's optical path, such that an image of the specimen is generated, having the characteristic magnification of the objective. In accordance with the invention, the one or more objective lenses hosted by the turret 18 might include, for example, a 4× objective and a 20× objective. Although not intended to be limiting in any manner, examples of robotically controlled microscopy systems that are suitable for use in connection with the present invention include the Olympus BX microscope system equipped with a Prior H1O1 remotely controllable stage. The Olympus BX microscope system is manufactured and sold by Olympus America Inc., Melville, N.Y., while the Prior H101 stage is manufactured and sold by Prior Scientific Inc., Rockland, Mass. Any other, similar, computerized stages may be used in practice of the invention, such as those manufactured and sold by Ludl Electronics Products Ltd., Hawthorne, N.Y.

The objective turret 18 of the microscope is controlled by a focus/objective control system 15 comprising a robotically controllable motor and motor driver combination, coupled to the objective turret 18, and configured to rotate the turret in order to bring various desired ones of perhaps multiple objective lenses into the microscope's optical path. Upon receipt of an appropriate movement command signal, the focus/objective control system 15 directs the motor to rotate the rotatable turret 18, thus moving a different objective lens into the optical path of the microscope system.

In one example, the X, Y control 16 comprises motors for controlling stage 14 in the x, y, and z directions, along with appropriate motor driver circuitry for actuating the motors. As used herein, the x and y directions refer to vectors in the plane in which the stage 14 resides; the z direction is orthogonal to both x and y and might refer to a vertical, or focus, direction. The mechanical apparatus and electronic control circuitry for effecting stage movement are preferably implemented to include some form of open or closed-loop motor positioning servo system such that stage 14 can be either positioned with great precision, or its translational movement can be determined very accurately in the x, y, and z directions. Instead of, or along with, controlling movement of the stage 14 in the x-y plane, the microscope 12 itself may be moved in the x-y plane. In this alternative embodiment, the microscope translational motion is controlled, or its position is determinable to the same degree of accuracy and with substantially the same positioning apparatus as the stage 14.

When X, Y control 16 is configured to operate in a closed-loop fashion, position feedback information can be recovered from the motor itself, or from optical position encoders or laser interferometer position encoders, if enhanced precision is desired. Closed-loop servo control of stage motion allows the stage position to be determined with great accuracy and insures that translation commands are responded to with high precision, as is well understood by those having skill in the motion control arts. Thus, a command to translate the stage 50 microns in the positive x direction will result in the stage 14 moving precisely 50 microns in +x direction, at least to the mechanical resolution limits of the motor system.

If the microscopy system is configured to operate in a semi-closed-loop or open-loop fashion, stage control is not dependent on feedback per se, but it is at least necessary to precisely define where the motors controlling the stage were told to go. For example, typical stepper motors will provide translational motion as a series of "steps" depending on a "direction" and "number of steps" command. So long as the translational movement per "step" is calibrated (or is otherwise determined or known) a movement command will result in the stage moving a known (or computed) distance, in the commanded direction. It only remains to save a record of the motion commands, along with a starting point, in order to determine the "present position" of the microscope stage A camera system 11 includes a main camera 22 and control electronics 24 as depicted in the exemplary embodiment of FIG. 1. Although a single main camera 22 is depicted, a plurality of main cameras may be suitably provided, as discussed in greater detail below. Position encoders may be coupled to the stage motors, or to the stage itself, and are adapted to transmit signals indicating the position of stage 14 to either the main camera 22, or its control electronics 24. This arrangement enables the camera(s) to capture images at desired predetermined positions, even while stage 14 is in continuous motion. For example, the position encoders may monitor the distance traversed by stage 14 (or movement commands, in the case of an open loop or semi-closed loop system) and transmit a predetermined signal every few microns of stage travel. Main camera 22 may be configured to capture an image in response to a set or a subset of such electrical signals received from the positioning feedback devices, which may be rotary or linear scale encoders, for example, thereby producing images of a microscope slide at regular intervals.

In one particular example, a linear encoder, mounted along the scan axis of the slide provides absolute positioning feedback to the control system to generate accurate periodic signals for image capture. These periodic signals act as external triggers to the camera for high speed consistent sectional image capture. This exemplary embodiment overcomes many positioning error issues, such as following errors (the difference of position from the electrically commanded position to the actual mechanical response of the positioning system to the commanded position) associated with the true transformation of electrical control signals to the actual mechanical position of the slide relative to the image plane of the camera. This exemplary embodiment may also safeguard against the periodic degradation of the mechanical hardware caused by the repeated use of lead screws, loose couplings, friction, environmental issues, and the like.

Alternatively, the main camera 22 may be configured to capture images at regular time intervals, or based on pulses transmitted to the motors. For example, control pulses sent to a stepper or a linear motor may be used. These could be raw transistor-transistor logic (TTL) signal pulses or amplified control pulses fed through an electronic counter circuitry generating an absolute or relative output pulse to trigger the camera for image capture, for example. A TTL step and direct signal, generated through a stepper controller pulse generator, as described above, may be fed back through the encoder feedback channel to the controller. In this arrangement, the integrated real time 'pulse counter' counts pulses to generate a periodic pulsed output for the camera. This technique may be used in conjunction with motor directional signal output as an input to the controller for bi-directional or uni-directional output trigger pulse control to capture images based on the direction of motion. Alternatively, clockwise and counter-clockwise operating modes may be used for motor control and to feed the directional pulses back to the controller for periodic camera triggering synchronized with motion.

In one aspect of the invention, focusing is performed by causing small excursions of the stage 14, in the z direction, under control of corresponding z control circuitry 17. Because the amount of relative motion during focusing is significantly smaller than the amount of relative motion during gross z translational movements, the focus circuitry 17 may comprise a micro-stepping motor controlled by appropriate motor driver circuitry which operates in parallel with a z axis stage translation motor. The z axis stage translation motor could, therefore, be provided with a more gross response characteristic such that it would be able to accommodate vertical optical sectioning of a specimen, i.e., viewing a specimen on various horizontal planes vertically disposed therethrough, while the focusing motor accommodates the micro-motions required to adequately focus each image plane.

In an alternative embodiment, focusing may be performed by causing small excursions of the objective turret 18 in the z direction, under control of focus/objective control system 15. For example, a piezo transducer may perform focusing by causing small excursions of objective turret 18 and its corresponding objective lens(es) 19 in the z direction in response to signals received from a piezo amplifier.

Illumination circuitry (not shown) controls the intensity of the illumination light source in conventional fashion.

Main camera 22 is preferably a high resolution, color, digital camera operating at a high-resolution and a high data rate. In the exemplary embodiment, a JAI CV-M7CL+ camera is contemplated for use, however, other cameras of comparable quality and resolution may also be used within the scope of the invention. Images captured by main camera 22 are directed via control electronics 24, such as a cameralink card, to control processor 20. As is well known by those having skill in the art, a cameralink card interfaces with digital cameras supporting the particular protocol and physical interface. Other protocols and physical interfaces are also contemplated in the context of the invention, and the particular interface described is not to be taken as limiting in any way.

The control processor 20, which may be implemented as a small platform computer system, such as an IBM-type x86 personal computer system, provides the data processing and platform capabilities for hosting an application software program suitable for developing the necessary command and control signals for operating the microscope system. Control processor 20 includes specialized software or circuitry capable of performing image processing functions. For example, control processor 20 may perform image analysis and obtain measurements of contrast, entropy, sharpness, etc. Control processor 20 may also contain specialized software or circuitry capable of manipulating and combining digital images. The control processor 20 is able to receive and interpret commands issued by a system user on a conventional input device, such as a mouse or a keyboard, and is further able to convert user defined commands into signals appropriate for manipulating the various components of the microscope system.

The control processor 20 is typically coupled to the microscopy system 10 through an interface (not shown), such as a serial interface, a Peripheral Component Interconnect (PCI) interface, or anyone of a number of alternative coupling interfaces, which, in turn, defines a system interface to which the various control electronics operating the microscope system are connected.

Embodiments of the invention provide improved systems and methods for constructing a virtual slide that does not rely on extremely precise mechanical positioning and is 10 much less computationally demanding than the prior art.

Figure 2:
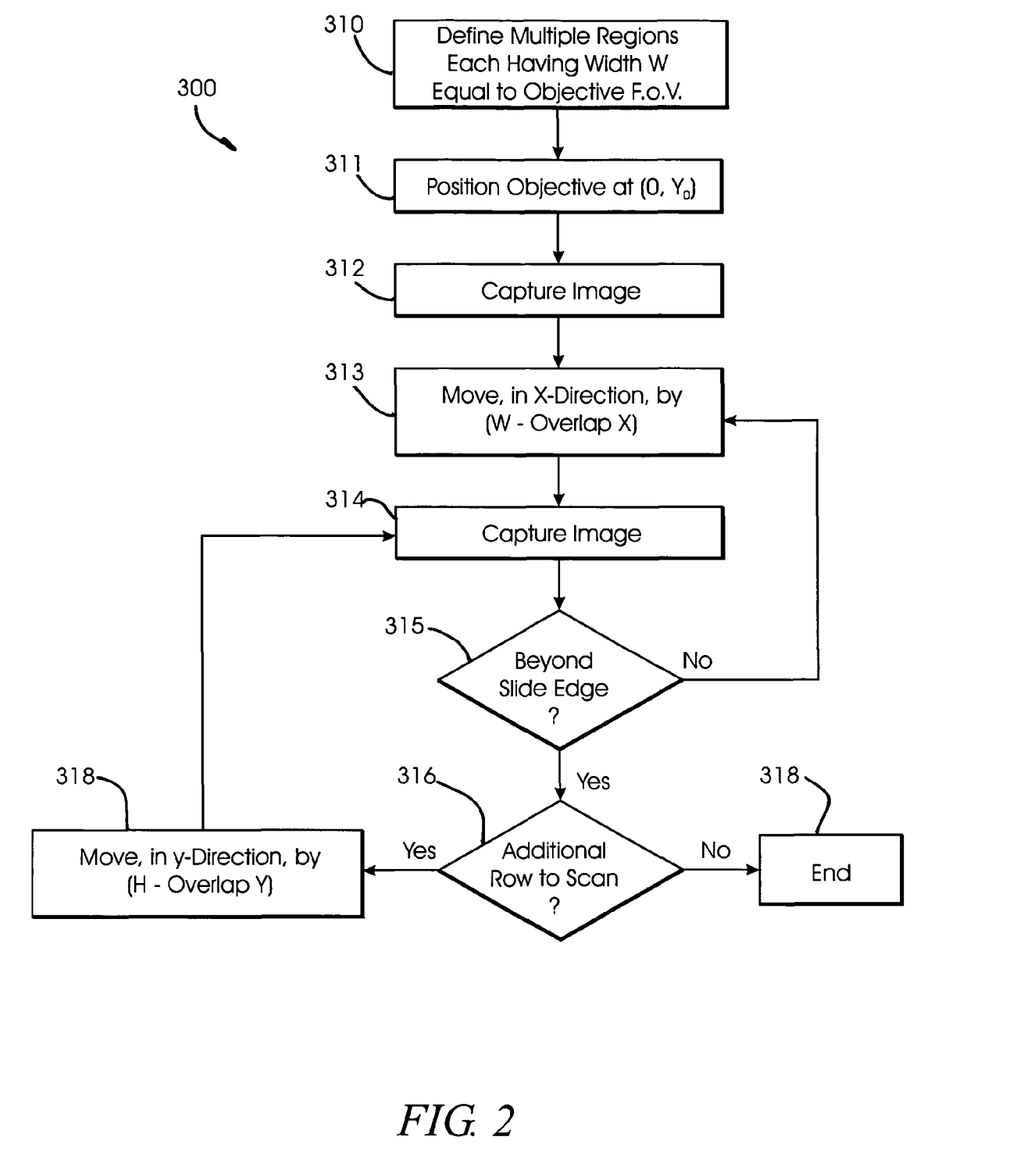
FIG. 2 is a flowchart depicting a method for scanning and capturing images of a microscope slide, in accordance with an exemplary embodiment of the invention.
Figure 3:
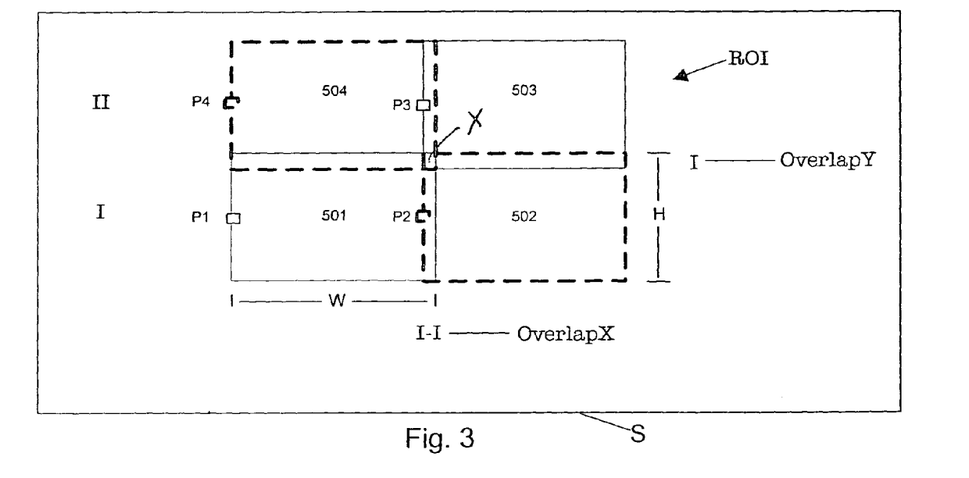
FIG. 3 is an example of a region of interest of a microscope slide, including 4 images, arranged in a manner based on the position of the microscope stage, and having overlapping edge regions in accord with an embodiment of the invention.

FIG. 2 is a flowchart of an example of a method, indicated generally at 300, for generating images of a microscope slide, in accordance with the present invention. In this regard, FIG. 3 is an example of a region of interest (ROI) of a microscope slide S, in which four images, 501, 502, 503, 504, arranged in two rows (row I and row II) will constitute the image that is being presented on a viewer, for example, to a user. The positions of the images are determined by the X, Y control 16 of the stage 14.

Referring now to FIG. 2, along with FIG. 3, multiple regions of the slide are defined during scanning, with each region having a width W and a height H approximately equal to the width and height of a field of view of the microscope's objective lens. The microscope objective is initially positioned such that the center of the viewing field of view is placed at a point P1 (0, y0) located on one edge of the slide, here, at an initial position in row I. In step 312 (FIG. 2), an image corresponding to region 501 is acquired in row I, having a width W and a height H. In step 313, X, Y control system 16 moves the stage 14 with respect to the objective lens such that point P1 is moved to position P2 by a distance equal to (W−Overlap X). It will be apparent to one skilled in the art that the objective turret 18 could also be moved relative to the slide in order to adjust the position P1 to position P2, and to cause other movements described further below, as well.

In the context of the invention, "Overlap X" is a predefined numerical value that will specify the approximate overlap introduced in the x axis between neighboring images. This number is preferably as small as possible and generally must be greater than at least the search radius in the x direction (termed herein "Search RX") plus the minimal area needed for a meaningful match between image region edges. The size of the search radius will be a function of the mechanical precision of the system and the minimal matching area depends on the resolution of the optical system and the size of the tissue features that comprise the content of the slide being viewed. In turn, the mechanical precision of the system is dependent upon the cumulative errors detracting from positional accuracy, such as the tolerances of the computer controlled stage 14 and other mechanical systematic discontinuities, as well as vibration, for example. An example of a suitable value of Search RX might well be 16 pixels while a suitable value for an exemplary Overlap X might well be 48 pixels.

Returning now to FIG. 2, step 314, at position P2, an image corresponding to region 502 is acquired. In step 315, the system determines if the end of the scan row (here row I), has been reached by asking if the position of the microscope objective relative to the sample is at the end of the scan row. If not, the system returns to step 313 and repeats the movement and acquisition steps 313 and 314 until the end of the current scan row is reached (i.e., the answer to the query of step 315 is Yes). Once at the end of the scan row, the system determines whether or not there is another row to scan, in step 316. In this example, scan row II is present so in step 317, the X, Y control system 16 moves the stage relative to the optics in the y direction by an amount (H−Overlap Y) to a position, P3.

"Overlap Y" is an additional predefined numerical value that will specify the approximate overlap in the y axis introduced between neighboring images. This numerical value is again preferably as small as possible and generally must be greater than at least the search radius in the y direction (suitably termed "Search RY") plus the minimal area needed for a meaningful match. As described above with respect to Search RX, the size of the search radius, Search RX, is a function of the mechanical precision of the system and the minimal matching area depends on the resolution of the optical system and the size of the tissue features. In a manner similar to the x axis exemplar above, an example of a suitable value of Search RY might well be 16 pixels while a suitable value for an exemplary Overlap Y might well be 48 pixels.

When the system 100 is at position P3, an image corresponding to region 503 is acquired in Step 314. The system 100 then repeats Steps 313 to 315, moving a distance (W-Overlap X) in the opposite x direction to that x direction of the previous scan row (in this case, this opposite x direction would be the negative x direction) to Position P4. An image corresponding to the next region, 504, is then acquired in Step 314. The result is a series of overlapping images, with edge regions of each image overlapping a next neighbor's edge regions along both x and y edges.

It will be understood by one skilled in the art that the positions at which the images are actually captured will not be exactly the same as the positions determined by the X, Y control 16 due to lack of mechanical precision in the positioning system, as discussed above. Therefore, the images will not align exactly as shown in FIG. 3.

Figure 4:
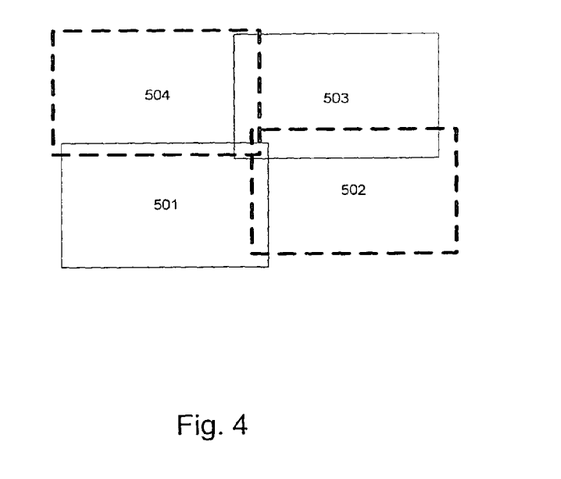
FIG. 4 is an example of a region of interest of a microscope slide, including 4 images, and having miss-registered edge overlaps, after being stitched.

In this regard, FIG. 4 shows an example of the actual positions of the images 501 to 504 that may have been captured, with an indication of the position errors that may have obtained during scanning. These errors may be small or large depending on the resolution of the image acquisition system and the mechanical precision of the motion control system. It should be appreciated that even a 1 pixel offset error is able to be perceived by the human eye. In a viewing system that is able to resolve images, at resolutions of 0.22 microns per pixel, even an error of one quarter of a micron (250 nanometers) may cause a perceptible error in positioning. Since the system believes that the positions of the images are actually as displayed in FIG. 3, the images will be necessarily misaligned on display if the actual positioning in FIG. 4 is not determined. As a result, image seams will appear due to lack of proper image alignment.

The image scanning and capture methodology, described above, can be used, by persons skilled in the art, to image an arbitrarily large region of interest. As various blocks of images are captured, they are simultaneously directed to a compressor subsystem and a matcher subsystem, which may be implemented in the control processor 20 or some other such processor. Each of these subsystems may be running one or more separate execution units, such as thread and process. This provides better system performance, stability and scalability. Separate processes are used as execution units on memory-protecting operating systems, such as Windows NT or any other UNIX like systems). Additionally, a low overhead data sharing mechanism (such as shared memory) may be used to store image data among different portions of the system. Stability is enhanced because a failure in one of the subsystems is less likely to bring down the entire system. Scalability is enhanced because more processing units (such as processors and distributed hosts) may be used in parallel-type architectures.

The compressor subsystem is operationally capable of invoking a variety of image compression systems that are intended to compress the content data of the scanned image blocks. Suitable image compression systems are well known in the art, and are exemplified by JPEG, JPEG2000, TIFF, GeoTIFF, PNG, and the like. Alternatively, blocks of images may be written to disk or other such memory storage device, in a raw, uncompressed format. An image is preferably stored in a format that allows retrieval of individual blocks on an individual basis.

Figure 10:
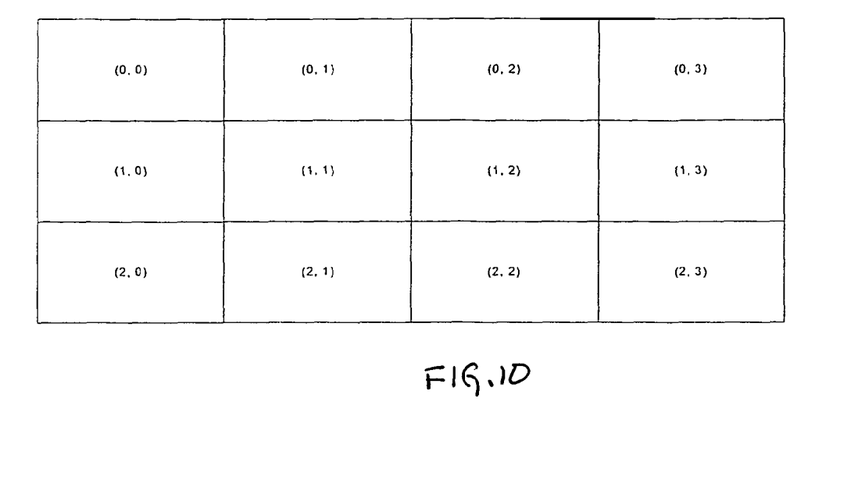
FIG. 10 is an example of a matrix sequence for storing blocks of images in a disk file, illustrating one method for indexing the individual regional blocks.

FIG. 10 is a diagram of an example of how image blocks might be stored in a row, column format that facilitates such direct retrieval. In the exemplary embodiment of FIG. 10, image regional blocks are indexed with their row, column identifiers, such that image block (1, 2) may be understood to represent the image region residing at the second row position (starting from modulo 0) and the third column position (again starting from modulo 0), beginning at the lower left position of the matrix. Image compression and storage formats such as TIFF, GeoTIFF, JPEG2000, and the like, allow such direct storage, as is well known in the art.

During compression, lower resolution versions of the image may be also be captured and saved along with a corresponding, desired higher resolution image. This form of multiple resolution capture and storage is known in the art as a "resolution pyramid", or as "pyramiding". It is done so because a wide field of view, necessarily having a lower resolution, is often considered a desired initial view of a tissue slide, for example. A clinician may examine a wide area initially, and determine that only a limited segment of the image totality requires evaluation at higher resolutions. If suitable regions of the image totality are available at the lower resolution, larger size images (consequently larger file sizes) do not need to be transmitted.

Figure 11:
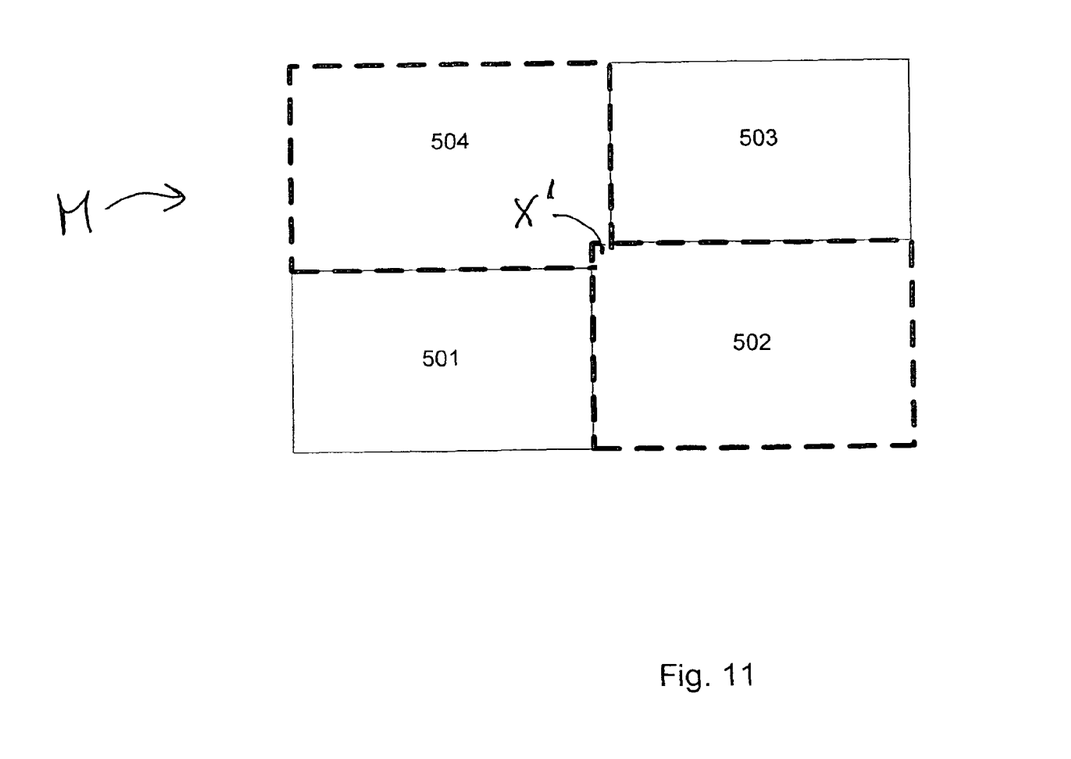
FIG. 11 is an example of four blocks of images, similar to the embodiment of FIG. 3, which have been combined together by eliminating overlapping areas.

When there are a large number of resolutions to be saved, the individual regional blocks of the lower resolution images may become quite small. In this case, multiple regional image blocks may be merged into one image by allowing only one of the images to contribute to the area where there is overlap. Since the overlapping areas provide the same data in each image block, only one image block is needed to contribute data for an overlapping area. FIG. 11 demonstrates elimination of multiple contributors to an overlapping area in combining four image blocks to form a single intermediate image M. Whereas, in the example of FIG. 3, image blocks 501 and 504 have overlapping areas, in the example of FIG. 11, image block 504 is selected as the only image block to contribute to that overlapping area for purposes of creating the lower resolution image.

Similarly, in the example of FIG. 3, all 4 image blocks contribute to the "four corners" overlap region X in the center, where edges of all four images converge. In the example of FIG. 11, by way of contrast, block 502 is selected as the only contributor to the central overlap region identified by X'. Selection of the image block that is chosen to contribute may be determined using multiple methods, such as arbitrarily selecting the block containing the best focus or the best contrast, or simply selecting the first image block that was retrieved by the software. With overlapping areas eliminated, a single image can be created that eliminates the image duplication that would be caused by the overlap.

As mentioned above, image blocks that are sent to the compressor subsystem are also directed to the matcher subsystem. As blocks of images arrive in the matcher subsystem, they are evaluated for relative positioning. If a particular block on the immediate left of a current block exists, (i.e., the current block is not on the left most column), the right edge of the block to the left is matched against the left edge of the current block, using an exhaustive normalized correlation search, in order to find the relative positioning of the images that results in the best match, i.e., to minimize the appearance of seams. Exhaustive normalized correlation is well known in the art and has been shown to be a reliable and robust method for image registration. While computationally intensive, normalized correlation (also termed NGC) is particularly suitable for finding patterns in spatially translated images.

Figure 8:
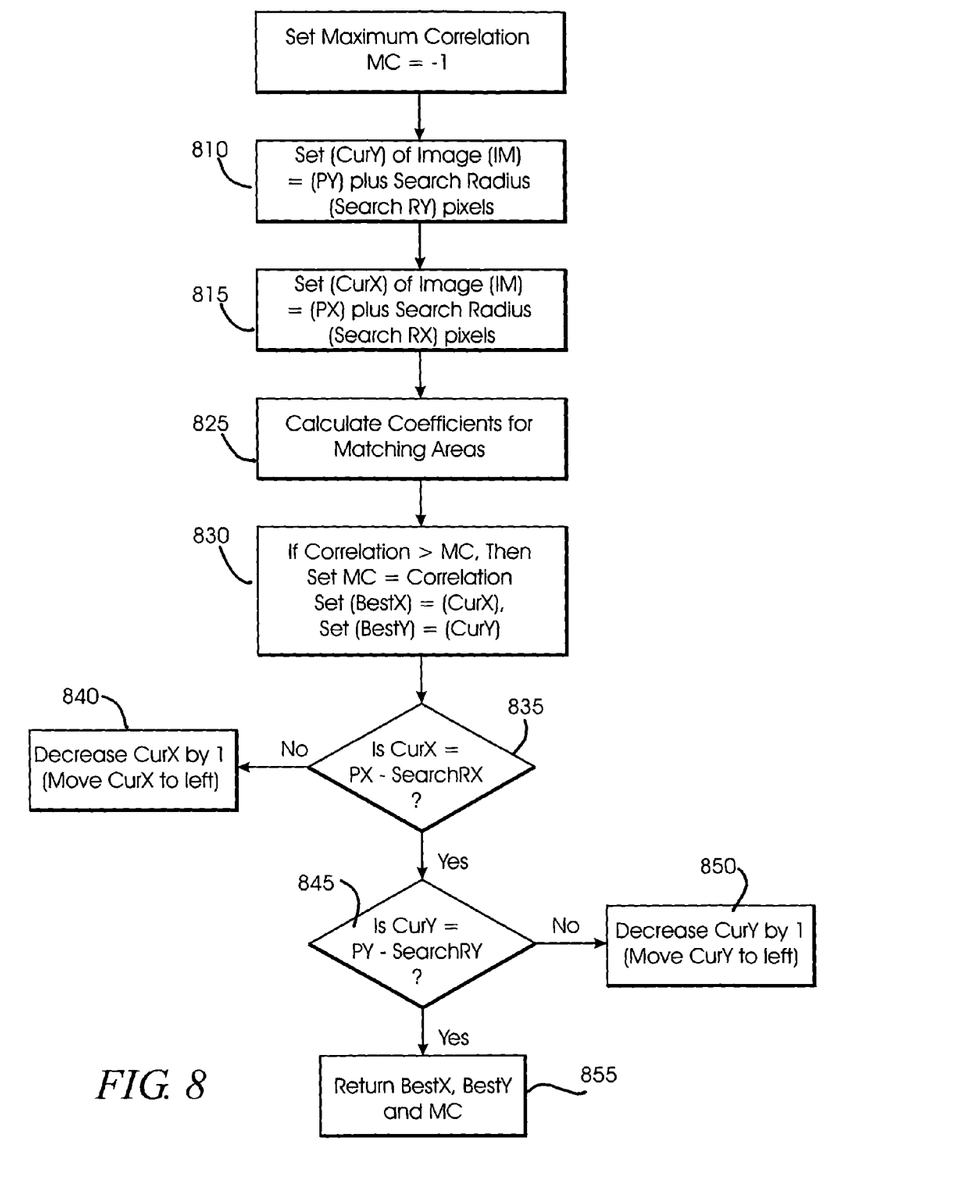
FIG. 8 is a flowchart demonstrating an exemplary methodology for an exhaustive correlation search between two overlapping images, in accordance with the invention.

FIG. 8 is a flowchart illustrating a set of representative steps of an example of a method 800 of applying such an exhaustive normalized correlation search to blocks of two images (matching a current block to the left block (along the x axis) or matching the current block to the block directly above (along the y axis), for example). The image block to match (1M) on the left edge (such as image 501 in FIG. 9) is sequentially moved to its starting position (designated by the coordinates CurX, CurY) relative to the current block (such as 502 in FIG. 9) through a range in the x direction, to the left and to the right, by a search radius X (Search RX). Similarly, the image block to match is further moved in the y direction (up and down) by a search radius Y (Search RY), as depicted in steps 810 and 815 of FIG. 8.

For each CurX and CurY, the correlation algorithm is invoked and a correlation coefficient is calculated, as at step 825 of FIG. 8. Initially, a maximum correlation (MC) value (which may have a value ranging from −1 to +1) is set. Where the calculated correlation coefficient is greater than the previously set value for maximum correlation (MC), the calculated value is returned as MC, and calculated x and y offsets, denoted herein as BestX and BestY, are returned as CurX and CurY respectively, as denoted at step 830. Additionally, it should be noted that this is an iterative process, with the returned values of CurX and CurY evaluated against the x and y search radii (Search RX and Search RY) as shown at steps 840 and 850.

This iterative process is to ensure that all of the possible overlapping permutations are evaluated, and that a resulting calculated offset vector, for the "stitched whole" does not cause any "open area" slippage once the blocks are combined. It should also be mentioned that the contemplated sizes (areas) of the image portions to be matched (the overlap regions) are considered equal. They will necessarily have similar lengths and widths, such that they define rectilinear portions that may be evaluated systematically, within defined positional boundaries (a particular number of pixels in both the x and y directions).

Referring back to FIG. 5, the resulting x and y offsets (BestX and BestY, respectively), along with a calculated correlation coefficient (MC in FIG. 8), are combined to form an extended horizontal offset vector denoted hOff (511 in FIG. 5). As those having skill in the art will appreciate, by inspection of FIG. 5, the horizontal offset vector, hOff, is the vector sum of the individual direction vectors of the x and y offsets, along one edge (chosen, here as the horizontal edge) of the image. It should also be understood that the offset vector and correlation coefficient are associated data values, with a particular MC value associated with its corresponding offset vector.

In this example, an extended vertical offset vector, denoted vOff, represents a positioning vector defining the direction and distance to move block 501 with respect to 502, in relation to the "other" directional image edge (here, the vertical edge) in order to obtain optimal positioning. It should be noted that the magnitudes of the extended offset vectors, hOff and vOff, are not represented to scale in FIG. 5. These extended offset vectors are then stored for later recall, along with the corresponding correlation coefficient. If a block above the current block exists (i.e., the current block is not the top row), then the bottom edge of the block above is matched against the top edge of the current block using an exhaustive normalized correlation search by the same procedure as described in FIG. 8, with the top image being the new image to match (1M).

Figure 9:
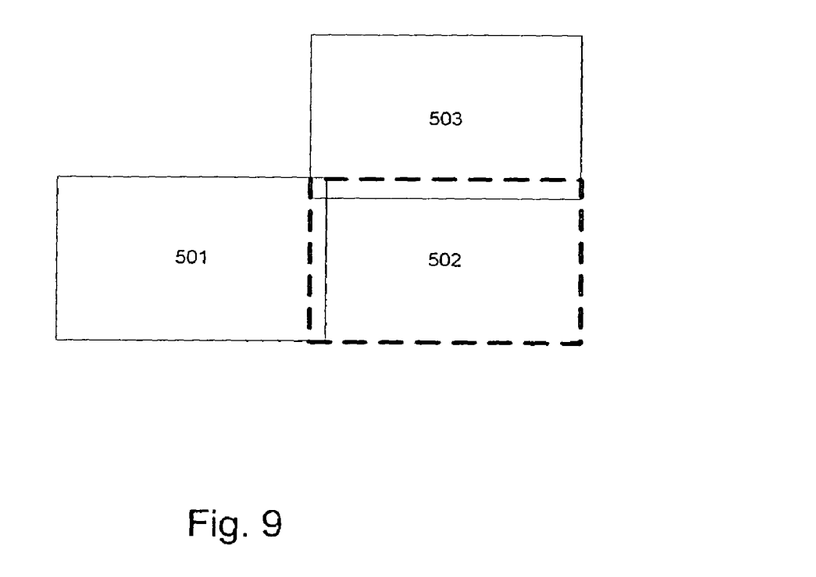
FIG. 9 is an example of a region of interest of a microscope slide, similar to the embodiment of FIG. 4, illustrating 3 images that have been positioned as requested by the positioning system, and having well-seamed overlapping image boundary edges.

In this example, the top image is block 503 in FIG. 9 and the current block remains the same block 502). The resulting x and y offsets, together with the correlation coefficient, are recorded as the extended vertical offset vOff (512 in FIG. 5). The vector vOff representing a positioning vector defining the direction and distance to move block 503 with respect to block 502 to obtain optimal positioning, in a manner similar to that described above. Applying hOff and vOff to the original image positions of block 501 and block 503 in FIG. 9 respectively, produces the accurately aligned set of image blocks 501, 502, and 503, depicted in the exemplary illustration of FIG. 5. Each extended offset may comprise an offset vector represented by a pair of integers and a correlation coefficient represented by a floating number with certain precision. It should be further noted that, in Step 825 of method 800, correlation is calculated for appropriately cropped matching areas, wherein the size of the matching areas remain constant for each pair of image blocks.

After the entire scan is completed, each image block has an associated extended horizontal offset as well as an associated extended vertical offset. The exception to this is image blocks on the topmost row and comprising the leftmost column. Necessarily, the topmost, and leftmost image block has no associated extended offsets. Image blocks on the top row (except for the aforementioned topmost, and leftmost image block) have only extended horizontal offsets. Image blocks on the leftmost column (except for the topmost, and leftmost image block) have only extended vertical offsets. These extended offsets are stored along with the blocks of images, either in the same file as associated metadata, or in a separate metadata file such as an XML file, binary file, or any other suitable retrievable file format.

In the case where the compressor subsystem creates a multiple resolution image set, extended offsets for the lower resolution images may also be created and saved by scaling down the magnitude of the calculated offset vectors by a certain percentage equal to the ratio of resolution (magnification) values. For example, if the hOff had a magnitude of 4 in the x direction and 6 in the y direction, the hOff for the 50% resolution image would be 2 in the x direction and 3 in the y direction. Scaling the lower resolution offsets from the higher is particularly beneficial, since it may be adequately assumed that correlation coefficients (and offsets) determined from a high resolution image will necessarily be more accurate than those determined from a low resolution image. This is particularly true in the case where lower resolution images are created from the higher.

A user typically wishes to view virtual slides on an image viewer apparatus. In accord with the invention, a block diagram of an image viewer suitable for use in connection with the methodologies described above, is shown in FIG. 12. The image viewer 900 in this example comprises a processor 902, operatively including a stitching subsystem 904, to be described in greater detail below. The image viewer further includes a display upon which image blocks are presented to the user. An image is typically displayed in a viewer window (formed under application software control) on the display. The image viewer 900 further includes memory 908 coupled to the processor, which may be non-volatile memory such as a disk drive, CD-ROM, or the like, and may alternatively be volatile memory, or any other such memory suitable for storing image blocks and other data referred to above.

Figure 12:
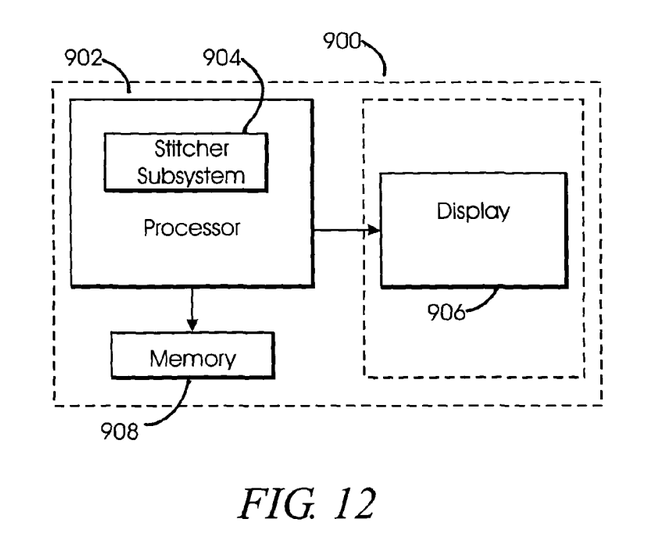
FIG. 12 is a semi-schematic block diagram of an image viewer apparatus, suitable for practice of principles of the invention.

The image viewer may be implemented as a stand-alone apparatus, or as a client device in a network (either an internet, or intranet). Image blocks and data may be obtained from a network source, such as the Internet, Ethernet, or network attached storage (NAS). During viewing, the memory 908, whether disk or other such memory, is accessed by the processor 902 of the viewer. When it is desired that certain images are to be viewed, a viewer application is invoked. The viewer application is preferably implemented as a software application, such as compiled C++, Java, Visual Basic, or similar program, running on a PC based operating system, such as Windows or OS-X. The stitching subsystem, which may be implemented as part of the viewer application program, stitches the saved images, dynamically, as the user scans across the virtual slide and the presented field of view changes. As mentioned above, the stitching subsystem may be implemented as firmware, in "application specific" hardware instead of, or along with, being implemented in software.

During the viewing process, the viewer application displays a field of view to the user. Image blocks necessary to represent the currently invoked field of view (typically 4 to 9 blocks are required to represent one field of view) are retrieved (and optionally cached in cache memory) along with the corresponding extended horizontal offset and extended vertical offset for these image blocks. To avoid presentation of partial blocks and to better handle data at the edges of the field of view, padding is preferably applied to provide at least one extra row or column around the four edges of the field of view. The stitcher subsystem is then invoked to position retrieved image blocks in the viewer window. If the image blocks are from a lower resolution level that was created by merging multiple images together and eliminating areas of overlap, then the stitcher subsystem is not invoked and images are simply displayed in their original positions.

Figure 5:
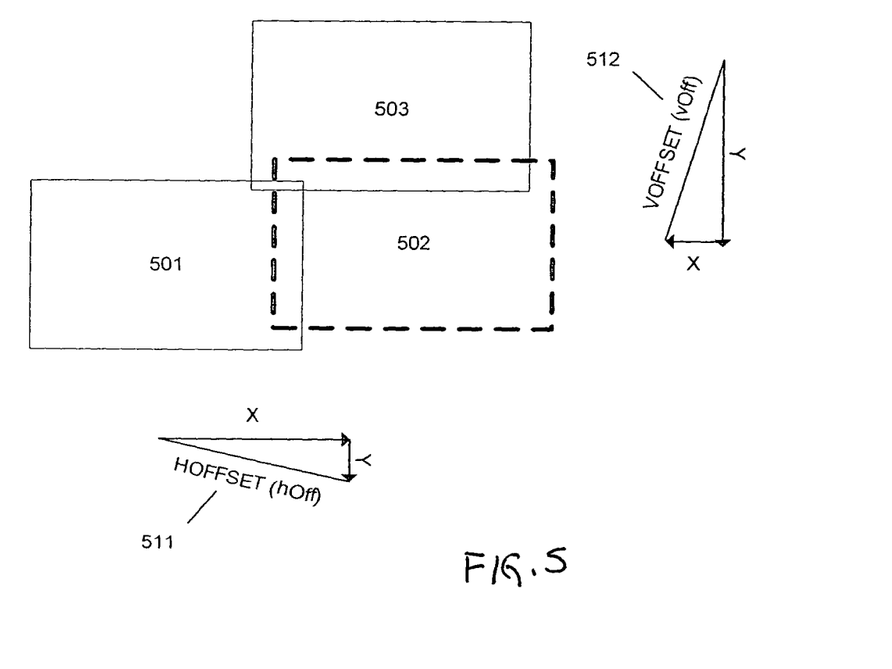
FIG. 5 is a simplified block diagram depiction of an example of positions of blocks of images after computation and application of offset vectors, in accordance with an embodiment.

The stitcher subsystem thresholds the correlation coefficient values to determine if there a true match between blocks. For example, if a correlation coefficient value is greater than 0.95, the corresponding offsets will position two blocks in a manner considered to be a true match. If the correlation coefficient is less than 0.95, the matching regions are probably over white space and the correlation coefficient is then set to −1. The connectivity criteria are defined as follows. Referring to FIG. 5, for any given block (such as 502), if the particular block is a true match with the block on the top (503), these two blocks (502 and 503) are considered to be connected. If the block is a true match with the block on the left (501), these two blocks (502 and 501) are also considered to be connected.

In one example of the invention, the stitching subsystem uses the above defined connectivity criteria and applies a standard coloring (labeling) algorithm, which is known in the art, to all the blocks. Blocks which are connected together will be assigned the same color (or label) and, thus form a connected component. Each connected component therefore consists of one or more blocks. Among the blocks of a connected component, one of the blocks is chosen to be represented as an anchoring block. For example, the topmost, leftmost block (i.e., the least block in the dictionary order) can be chosen as the anchoring block, with the remaining blocks connected thereto in accord with the invention.

Figure 6:
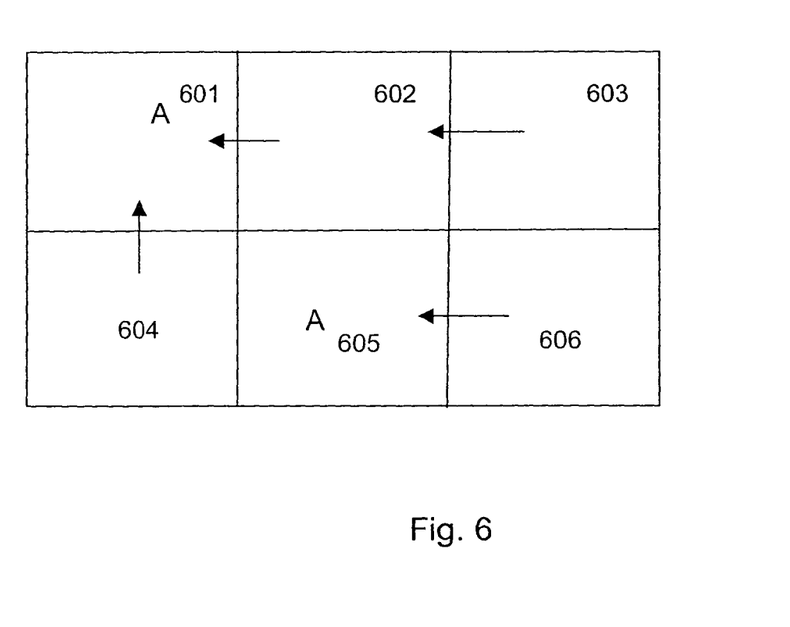
FIG. 6 is a generalized depiction of the connectivity paths between image blocks and an anchoring block, in accordance practice of principles of the invention.

In this regard, FIG. 6 illustrates two connected component sets, one of which comprises four blocks 603, 602, 601, and 604, anchored to block 601, the other of which comprises two blocks, where block 606 is anchored to block 605. The blocks marked with "A" (blocks 601 and 605) are the anchoring blocks. It should be noted, here, that the illustration of FIG. 6 depicts image block connectivity flow, rather than the block's offset information.

The anchoring block may be positioned arbitrarily, but is preferably pinned to its original position (the initial position that was returned when the blocks of images were commanded to be captured, as in FIG. 3). This results in the anchoring block having an effective offset of 0, 0 from its original denoted position and, therefore, an absolute positional offset of x=0, y=0. Any block in the same connected component can be traced to the anchoring block through at least one connectivity path. For example, in the exemplary embodiment of FIG. 6, a connectivity path is established from block 603 to the anchoring block 601 along the connectivity path 603 to 602, and 602 to 601 (the anchor A).

Positional offsets must then be computed for each non-anchor image block retrieved. The extended offsets are accumulated along the path to the anchoring block to determine the positional offset for a given block. The positional offset can also be added to the anchoring block's offset to determine an absolute positional offset for that given block. For example, in FIG. 7, if the extended vertical offset for the block 704 is x=4, y=6, and the correlation coefficient=0.99, and the extended horizontal offset for the block 702 is x=1, y=−2, with a correlation coefficient=0.98, then the combined extended offset for the path 704 to 702 to 701 will be a combination of the valuations for each path, i.e., x=4+1=5, Y=6+(−2)=4 and a combined correlation coefficient=0.99*0.98=0.9702. The offset x=5, y=4 is then the positional offset and the correlation coefficient of 0.9702 is used as the score for the path. The absolute positional offset can then be determined by adding the positional offset x=5, y=4 to the offset of the anchor block offset (typically x=0, y=0) yielding an absolute positional offset of x=5+0=5, y=4+0=4.

Figure 7:
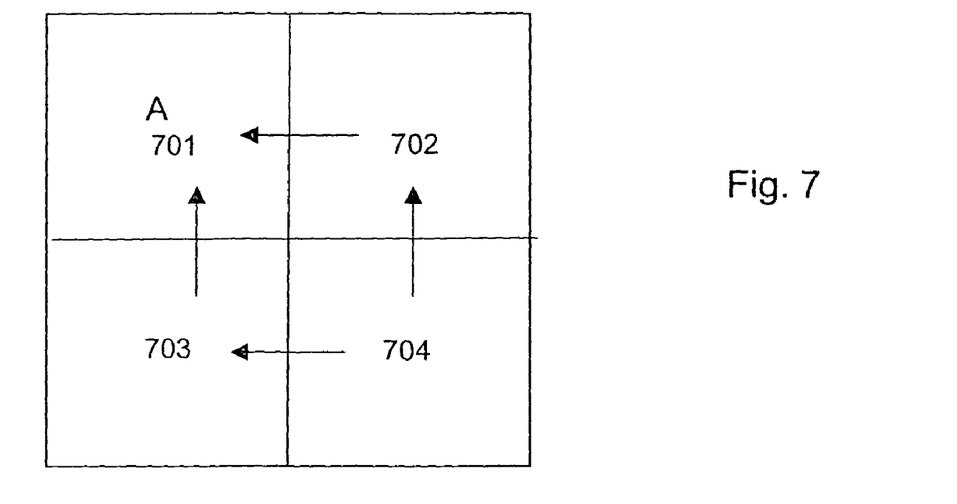
FIG. 7 is an example of an alternative embodiment of connectivity paths connecting an image block to an anchoring block, in accordance with the invention.

Additionally, there may be two or more distinct paths to the anchoring block. For example, as shown in FIG. 7, block 704 may connect to the anchoring block 701 through the path 704-702-701 or the alternative path 704-703-701. In order to decide which of the two will become the optimal path, the correlation coefficients along each path may be multiplied together to form a score for the path. The path with highest correlation score may be chosen as the optimal path. The positional offset and absolute positional offset computed along the optimal path is then used while other paths are discarded.

The retrieved block of image 704 is then painted into the viewer window, offset from its original position by the above calculated absolute positional offset. After the process discussed above (computing correlation scores, determining positional offsets, and absolute positional offsets, etc.) is repeated for all the blocks as needed, a seamless (or nearly seamless) image of the field of view of interest will be in the viewer window.

The user may then request a new field of view to be displayed. The process described above (i.e., requesting image blocks, thresholding, applying connectivity criteria to a labeling algorithm to determine connected components, selecting anchoring block(s), determining position offsets and absolute positional offsets along optimal path, and painting), is repeated and the new field of view is presented to the viewer and user.

It will be appreciated, now, that this methodology represents a much simpler and computationally less intensive rendering scheme that those of prior art systems. Certain calculations are performed a priori (the offsets and correlation coefficients), but dynamic stitching only occurs as a function of viewing, and then only as a function of the actual field of view presented to the user. Only as the field of view changes, does the system of the invention perform the stitching operation, and only with respect to new content appearing on the display, or new image blocks that must be invoked to contribute to a field of view.

The imaging and viewing systems of FIGS. 1 and 12 are disclosed herein in a form in which various functions are performed by discrete functional blocks. However, many of these functions could be embodied in an arrangement in which the functions of one or more of those blocks are realized, for example, by one or more appropriately programmed processors. Additionally, the various imaging systems and methodologies have been described in separate fashion, in order to clearly delineate certain novel features thereof. It should be understood by those having skill in the art that many of the techniques and apparatus may be combined and/or substituted for one another without impacting the utility of the invention. It should be further understood that the various motions and axes described above were described with axis notations of convenience and are not meant to imply specific directions or aspects in space. Translations of an objective lens might be implemented by stage motion, turret motion, or motion of the microscope head itself. How motion is accomplished is immaterial, so long as the motion is with respect to an index position on a slide and is characterizable, measurable and repeatable.

Further, the methodologies of the invention have been described in the context of steps represented in various flow charts. The steps of the invention need not be performed in the specific sequence described, nor need they be performed at the described particular moment in time. All that is necessary for practice of the invention, is determination of relative offset values of regional image blocks, calculation of a correlation score for matching areas, and dynamic presentation of multiple regional image blocks as a field of view of a virtual slide, where the displayed image is only evaluated and adjusted to account for misalignment on a field-of-view basis.

The foregoing, therefore, merely illustrates the principles of the invention. It will thus be appreciated that those skilled in the art will be able to devise numerous other arrangements which embody the principles of the invention and are thus within its spirit and scope. The embodiments described above and depicted in the figures are not meant to be limiting, but rather illustrative of the invention which is to be limited only by the appended claims.

The invention claimed is:

1. A method for viewing a digital, virtual slide, the method comprising:
   capturing multiple digital regional images for each physical slide using a digital imaging device;
   scanning the physical slide in accord with the defined multiple digital regional images;
   storing the scanned images in accord with a positional index metric associated to each image's location in a mosaic representation of the entire physical slide;
   performing a normalized correlation search on next neighbor regional image blocks;
   determining a set of relative positional offset values and a correlation coefficient for a regional image block and each of a plurality of next neighbor regional image blocks;
   viewing a first field of view consisting of less than all of the multiple digital regional images and including a portion of the regional image block and a portion of at least one of the next neighbor regional image blocks;
   stitching together a first composite image of the portion of the regional image block and the portion of the at least one next neighbor regional image block, the stitching being limited to said portions of the first regional image block and the at least one next neighbor regional image block contained within the field of view and using only the relative positional offset values and the correlation coefficient for the regional image blocks contained within the first field of view;
   viewing a second field of view including a portion of the regional image block and a portion of a next neighbor regional image block not included in the first field of view; and
   stitching together a second composite image of the portion of the regional image block and the portion of the at least one next neighbor regional image block included in the second field of view, the stitching using only the relative positional offset values and the correlation coefficient for the regional image blocks contained within the second field of view without regard to the relative positional offset values and the correlation coefficient for the regional image blocks contained in the first field of view and not contained in the second field of view.

2. The method according to claim 1, further comprising:
   defining multiple regions for each physical slide, each region having an area characterized at least by a width dimension;
   capturing an image of a first defined region, wherein the microscope is positioned, relative to the physical slide, at a first position;

adjusting the position of the microscope to a second position characterized by W and a first overlap value;

capturing an image of a second defined region, wherein the second region and the first region share image data contained within an overlap region defined by the first overlap value.

3. The method according to claim 2, wherein the determining step is performed on image data contained in the overlap region between next neighbors.

4. The method according to claim 2, further comprising:
defining multiple regions for each physical slide, each region having an area characterized at least by a height dimension;
capturing an image of a first defined region, wherein the microscope is positioned, relative to the physical slide, at a first position;
adjusting the position of the microscope to a second position characterized by the height dimension and a second overlap value;
capturing an image of a second defined region, wherein the second region and the first region share image data contained within an overlap region defined by the second overlap value.

5. The method according to claim 4, wherein the determining step is performed on image data contained in either of the overlap regions between next neighbors.

6. The method according to claim 4, wherein the determining step is performed on image data contained in both of the overlap regions between next neighbors.

7. The method according to claim 2, wherein the set of relative positional offset values and a correlation coefficient for a regional image block and a next neighbor regional image block is determined by a normalized correlation search.

8. The method according to claim 7, wherein the set of relative positional offset values and a correlation coefficient associated to each regional image block is stored as a data set corresponding to that regional image block.

9. The method according to claim 8, further comprising:
displaying a subset of the regional image blocks in a display;
joining the overlapping portions of next neighbor regional image blocks by positioning each block with respect to its next neighbor in accord with the set of relative positional offset values determined for the blocks.

10. The method according to claim 9, wherein the set of relative positional offset values are applied to next neighbor blocks with respect to an anchor block.

11. A method for seamlessly joining regional images together into a composite image defining a field of view of the viewing system, the method comprising:
subdividing a physical microscopy slide into a matrix of composite regional images, each regional image having a row, column index position within the matrix;
using a digital imaging system to scan the physical microscopy slide with a chosen objective lens such that the lens field of view is equivalent to a size of one of the composite regional images;
overlapping a specified portion of a next neighbor regional image with a current regional image, such that the images share image data in the specified overlap portion;
determining a set of offset values for the current image and its next neighbor to correlate the overlap portion for the current regional image with the overlap portion of the next neighbor image;
viewing a field of view consisting of less than all of the regional images and including a portion of the regional image blocks and stitching together only the regional image blocks contained within the field of view to form a composite image; and
displaying the composite image, including the current regional image stitched to the next neighbor image, without regard to offset values of regional images not being presently displayed.

12. The method according to claim 11, wherein the determining step further comprises generation of a correlation coefficient for the overlap portions based upon the determined offset values.

13. The method according to claim 12, further comprising:
evaluating which particular ones of the composite regional images are required to represent a currently invoked field of view of a virtual microscopy slide;
retrieving said particular ones of the composite regional images along with the corresponding sets of offset values and associated correlation coefficients;
locating retrieved regional images in a viewer, in accord with their nominal index position within the matrix;
comparing correlation coefficient values of next neighbor images against a threshold value;
defining a positive connectivity criterion between next neighbor images having correlation coefficient values greater than or equal to the threshold; and
positioning said retrieved images with respect to one another such that overlap portions of next neighbor images define a seamless edge between the two next neighbor images.

14. The method according to claim 13, further comprising:
applying a connected components labeling algorithm to the plurality of regional images;
assigning a common algorithmic label to regional image blocks having a positive connectivity criterion associated therewith; and
forming the image blocks, having the common algorithmic label, into a connected component.

15. The method according to claim 14, wherein one overlap region is chosen from either a current image block or the next neighbor image block as representing the digital image data contained in the overlap region, said retrieved images are positioned with respect to one another such that the chosen overlap region defines a seamless edge between the two next neighbor images.

16. A microscopy system of the type in which physical material sample slides are supported for viewing and image capture, the physical slides moveable through a microscope optical field of view, the system comprising:
a microscope, including a rotatable turret holding a plurality of microscope objectives, each objective with a corresponding magnification;
a robotically controlled sample stage, the stage movable along orthogonal planar axes;
means for determining a present position of the stage along each of the axes, with respect to an initial index position;
a processor, coupled to the stage, the processor controlling stage motion such that a physical slide may be scanned as digital data into a memory data store, the physical slide represented as a matrix of composite image blocks, each image block having a corresponding row, column location within the matrix, wherein each image block is characterized by dimensions in first and second directions, the processor causing next neighbor image blocks to be scanned such that a specified and reproducible overlap portion is created therebetween;
a correlation processor, the correlation processor determining offset values, along the first and second directions, between next neighbor image blocks, wherein the offset values define a relative positioning vector necessary to position the next neighbor image blocks with respect to one another such that their overlap portions appear as a seamless edge region;

a viewer to display a portion of the matrix of composite image blocks as a partial image of the physical slide; and an image stitcher presenting a field of view consisting of only a portion of the matrix of composite image blocks for viewing and stitching next neighbor blocks together, wherein the image stitching is limited to image blocks within the field of view, wherein the image stitcher is further operative to stitch subsequent image blocks into a field of view as a user invokes movement along the first and second directions to a new field of view, without regard to offset values of regional images not being presently displayed.

* * * * *